(12) United States Patent
Pretorius

(10) Patent No.: US 12,091,248 B2
(45) Date of Patent: Sep. 17, 2024

(54) BI-DIRECTIONAL SHUTTLE

(71) Applicant: Storage Management Systems (PTY) LTD, Irene (ZA)

(72) Inventor: Theunis Jacobus Pretorius, Silverlakes (ZA)

(73) Assignee: PATOU INVESTMENTS (PTY) LTD, Pretoria (ZA)

( * ) Notice: Subject to any disclaimer, the term of this patent is extended or adjusted under 35 U.S.C. 154(b) by 350 days.

(21) Appl. No.: 17/609,951

(22) PCT Filed: May 26, 2020

(86) PCT No.: PCT/ZA2020/050027
§ 371 (c)(1),
(2) Date: Nov. 9, 2021

(87) PCT Pub. No.: WO2020/247986
PCT Pub. Date: Dec. 10, 2020

(65) Prior Publication Data
US 2022/0204263 A1    Jun. 30, 2022

(30) Foreign Application Priority Data
Jun. 5, 2019   (ZA) .................................. 2019/03593

(51) Int. Cl.
*B65G 1/04*    (2006.01)
(52) U.S. Cl.
CPC .................................. *B65G 1/0492* (2013.01)
(58) Field of Classification Search
CPC .................................................. B65G 1/0492
See application file for complete search history.

(56) References Cited

U.S. PATENT DOCUMENTS

| 5,370,492 A | 12/1994 | Gleyze et al. |
| 6,652,213 B1 | 11/2003 | Mitchell et al. |

(Continued)

FOREIGN PATENT DOCUMENTS

| CN | 103101737 A | 5/2013 |
| CN | 103612882 A | 3/2014 |

(Continued)

OTHER PUBLICATIONS

Search Report and Written Opinion mailed Sep. 18, 2020 in International Application Serial No. PCT/ZA2020/050027.

*Primary Examiner* — Saul Rodriguez
*Assistant Examiner* — Lucia Elba Rodriguez
(74) *Attorney, Agent, or Firm* — Billion & Armitage

(57) ABSTRACT

A bi-directional shuttle (10) includes: (i) a support platform (14) for supporting goods thereon; (ii) a carriage (12); (iii) at least two primary wheels (22) rotatably connected to the carriage; (iv) at least two secondary wheels (24) fixed against displacement relative to the support platform; the axes of rotation of the secondary wheels being perpendicular to the axes of rotation of the primary wheels; (v) a link (16) that is pivotally connected to the carriage about a link pivot axis, and that includes a bearing surface (30) that is spaced from the link pivot axis; and (vi) a limiter (32) that limits displacement of the bearing surface away from the support platform. When: (a) the primary wheels protrude further from the support platform than the secondary wheels, angular displacement of the link about the pivot axis causes the support platform operatively to be raised or lowered: and (b) the secondary wheels protrude further from the support platform than the primary wheels, angular displacement of the link about the link pivot axis causes the carriage operatively to be raised or lowered.

8 Claims, 3 Drawing Sheets

(56) References Cited

U.S. PATENT DOCUMENTS

2014/0277693 A1    9/2014  Naylor
2017/0021056 A1    7/2017  Van Den Berk et al.

FOREIGN PATENT DOCUMENTS

| CN | 103895995 A | | 7/2014 | |
|---|---|---|---|---|
| CN | 103896000 A | | 7/2014 | |
| CN | 105059811 A | | 11/2015 | |
| CN | 103612882 B | * | 11/2016 | |
| CN | 108190341 A | * | 6/2018 | ........... B65G 1/0407 |
| CN | 108584336 A | * | 9/2018 | ............. B65G 35/06 |
| DE | 1556071 A | | 9/1969 | |
| EP | 3090966 A1 | | 11/2016 | |
| EP | 3235761 A1 | * | 10/2017 | ............... B65G 1/00 |
| EP | 3456663 A2 | | 3/2019 | |
| GB | 1326304 A | | 8/1973 | |
| JP | S5621955 A | | 2/1981 | |
| WO | 200507789 A1 | | 1/2005 | |
| WO | 2007007354 A1 | | 1/2007 | |
| WO | WO-2020062208 A1 | * | 4/2020 | ........... B65G 1/0492 |

* cited by examiner

BI-DIRECTIONAL SHUTTLE

BACKGROUND

The present invention relates to a bi-directional shuttle. More specifically, the present invention relates to a bi-directional shuttle for moving goods about a warehouse.

Various shuttles for use in warehousing are known. For example:

U.S. Pat. No. 6,652,213 describes a uni-directional shuttle for use on a bi-directional rail system;

US2014/0277693 "Storage, retrieval and sortation system" and US2015/0307276 "Robot for transporting storage bins" describe shuttles with sets of wheels oriented perpendicular to each other;

CN103612882, CN103895995, CN103896000, CN105059811, DE1556071, GB1,326,304 "Material handling apparatus", US2017/0210562 "System for storing product containers", U.S. Pat. No. 5,370,492 "Automated stores and novel type of truck making it possible for the products to be positioned in or extracted from the storage zones", WO2005/07789 "An automated warehouse, and an autonomous vehicle for transferring load units for said automated warehouse" and WO2007/007354 "System for the general warehouse management of pallets, motor vehicles or the like" describe bi-directional shuttles with sets of wheels that displace vertically relative to each other; and EP3456663 describes various mechanisms for raising bi-directional shuttle wheels.

A drawback of prior art shuttles is that an intricate mechanism is required to lift a first set of wheels relative to a second perpendicular set of wheels. Typically, such mechanisms require an additional motor. Since shuttles for warehousing need to be squat to fit underneath stored goods, the addition of an intricate mechanism or the addition of an additional motor is generally problematic.

It is an object of the present invention to address this drawback, and to provide a mechanism that uses the motor that vertically displaces the shuttle's lifting platform to raise/lower one set of wheels relative to the other perpendicular set of wheels.

SUMMARY OF THE INVENTION

According to a preferred embodiment of the invention, there is provided a bi-directional shuttle that includes:
a support platform for supporting goods thereon;
a carriage;
at least two primary wheels rotatably connected to the carriage;
at least two secondary wheels fixed against displacement relative to the support platform, the axes of rotation of the secondary wheels being perpendicular to the axes of rotation of the primary wheels;
a link that is pivotally connected to the carriage about a link pivot axis, and that includes a bearing surface that is spaced from the link pivot axis; and
a limiter that limits displacement of the bearing surface away from the support platform,
wherein:
when the primary wheels protrude further from the support platform than the secondary wheels, angular displacement of the link about the pivot axis causes the support platform operatively to be raised or lowered; and when the secondary wheels protrude further from the support platform than the primary wheels, angular displacement of the link about the link pivot axis causes the carriage operatively to be raised or lowered:

Generally, the bearing surface is a roller that is rotatably connected to the link.

Typically, the limiter defines a rail in which the roller is captured, but moveable there along.

Preferably, the limiter is connected to the support platform.

Generally, the bi-directional shuttle includes eight primary wheels and six or eight secondary wheels.

Typically, the support platform is generally cuboid.

Preferably, the primary wheels are associated with a first pair of opposed sides of the platform; and the secondary wheels are rotatably connected to a pair of bogies, which bogies are connected to a second pair of opposite sides of the platform.

Generally, the bi-directional shuttle includes four sets of links with rollers and limiters.

Typically, the bi-directional shuttle further includes: a first motor for causing angular displacement of the link about the pivot axis; a second motor for rotating the primary wheels; and a third motor for rotating the secondary wheels.

BRIEF DESCRIPTION OF THE DRAWINGS

The invention will now be described in more detail, by way of example only, with reference to the accompanying drawings in which.

DESCRIPTION OF THE INVENTION

Figure 1:
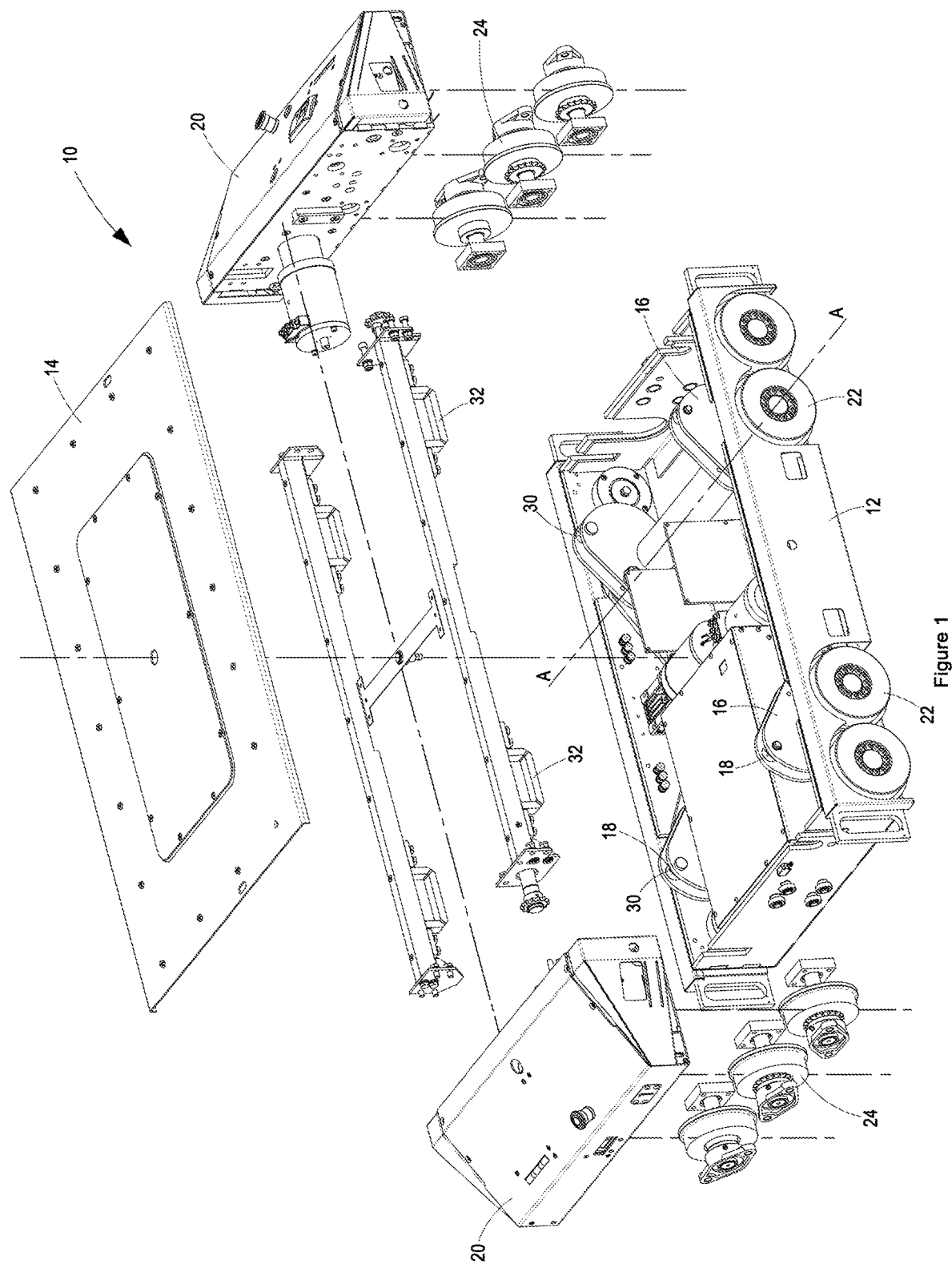
FIG. 1 is a perspective exploded view of a bi-directional shuttle according to a preferred embodiment of the invention.
Figure 2:
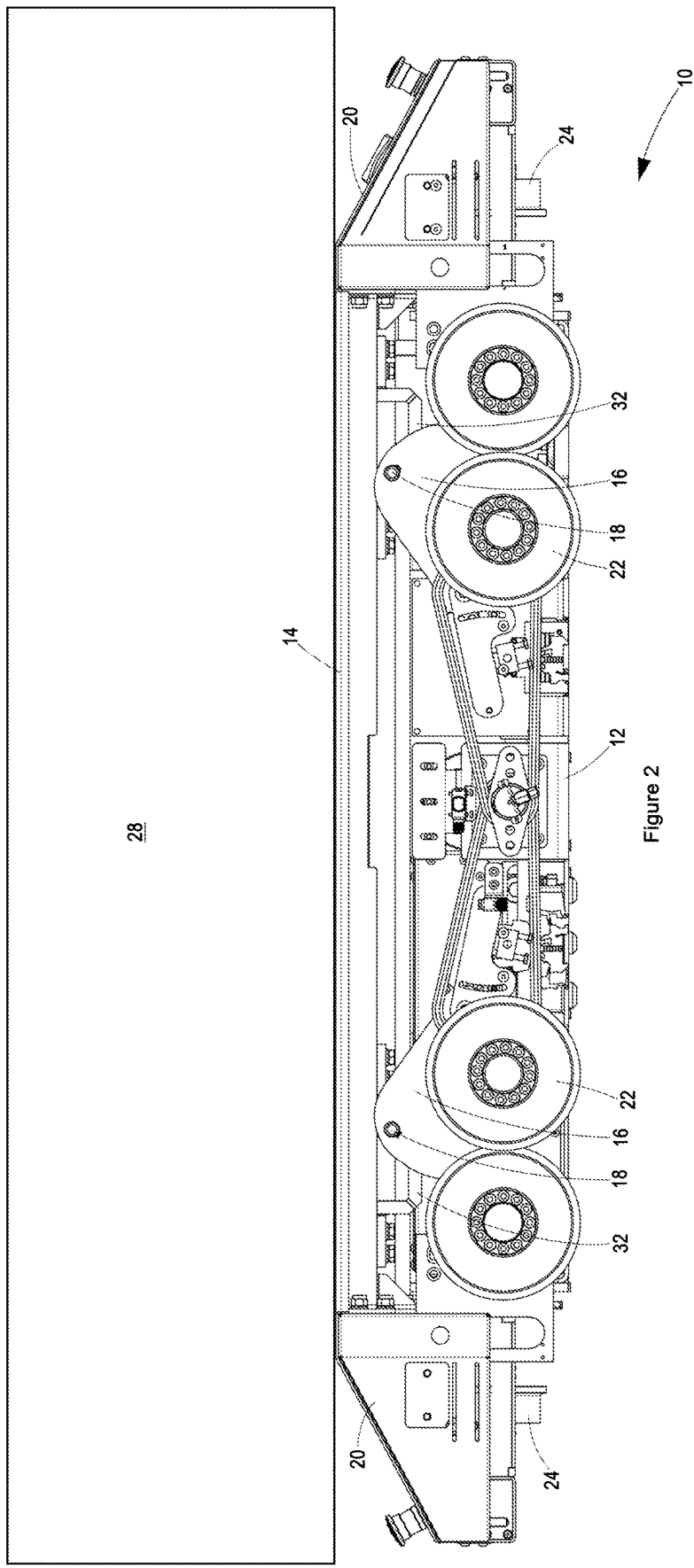
FIG. 2 is a partially cut-away side view of the bi-directional shuttle in FIG. 1, with the primary wheels protruding further from the support platform than the secondary wheels.
Figure 3:
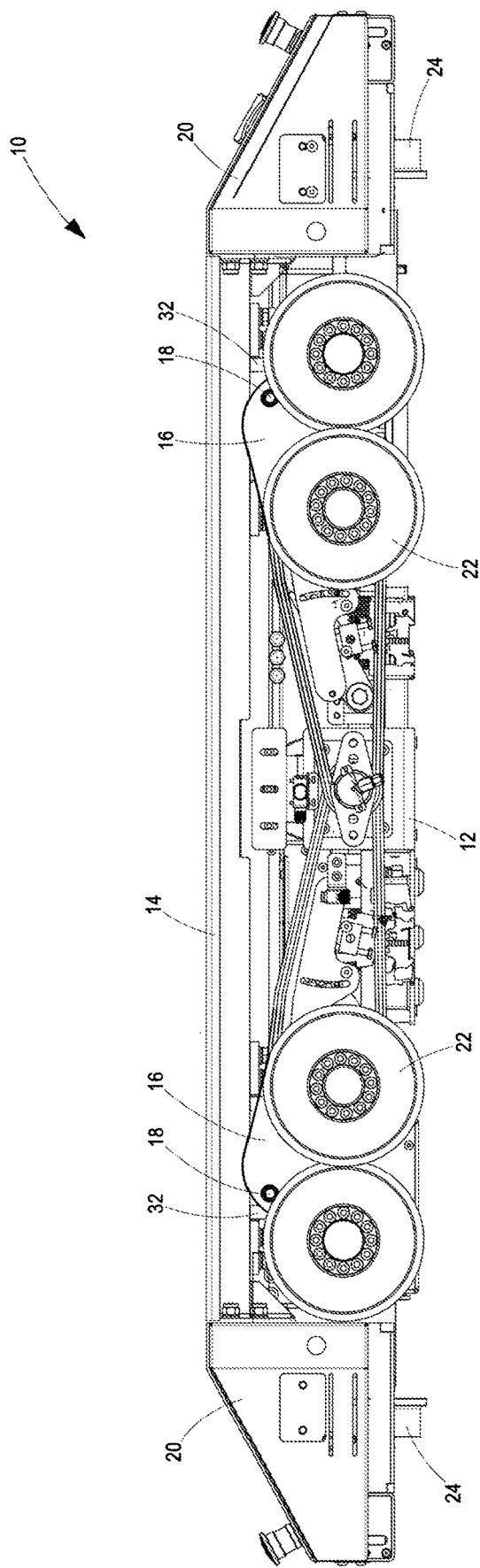
FIG. 3 is a partially cut-away side view of the bi-directional shuttle in FIG. 1, with the secondary wheels protruding further from the support platform than the primary wheels.

With reference to FIGS. 1 to 3 of the drawings, a bi-directional shuttle 10 includes a carriage 12, a support platform 14, a link 16, a bearing surface 18, a pair of bogies 20, primary wheels 22 and secondary wheels 24. In use, the shuttle 10 travels autonomously underneath goods 28 stored in a warehouse to raise and transport the goods about the warehouse.

The carriage 12 comprises a chassis for the shuttle 10, and is generally cuboid in shape. The carriage 12 houses most of the electronics and motors necessary for autonomous movement of the shuttle 10. Eight primary wheels 22 are rotatably secured to the carriage 12 along opposed first sides of the carriage 12, with their axes of rotation parallel to each other. In use, the primary wheels 22 drive the shuttle 10 linearly in a first direction.

The support platform 14 is connected to the operative top of the carriage 12, so as to permit operative relative vertical displacement of the support platform 14 and carriage 12. The support platform 14 is also generally cuboid, defining opposed first sides associated with first sides of the carriage 12/primary wheels 22, and opposed second sides. The support platform 14 defines a planar operative upper surface for supporting goods 28 thereon.

The link 16 is in the shape of a cam. The link 16 is pivotally connected to the carriage 12 about a link pivot axis A-A, and extends towards the support platform 14. A roller 30 is rotatably connected to the cam 16, which roller 30 provides a bearing surface 18 (spaced from the link pivot axis A-A) that contacts the operative underside of the support platform 14, in use, to displace the support platform 14 relative to the carriage 12. It will be appreciated that: rotation of the link 16 in a first direction generally causes the support platform 14 operatively to be raised relative to the carriage 12, and rotation of the link 16 in an opposite second direction generally causes the support platform 14 operatively to be lowered relative to the carriage 12. Four sets of links 16 extend between the carriage 12 and the support platform 14.

Six or eight secondary wheels 24 are rotatably connected to the pair of bogies 20. The bogies 20 are, in turn, fixedly connected to the opposed second sides of the support platform 14 so as to prevent relative displacement of the bogies 20 and secondary wheels 24 on the one hand and the support platform 14 on the other hand. It will be appreciated that the bogies 20 move in sympathy with the support platform 14, relative to the carriage 12. The secondary wheels 24 are arranged with their axes of rotation parallel to each other (and perpendicular to the axes of rotation of the primary wheels 22), to drive the shuttle 10 linearly in a second direction perpendicular to the first direction.

A first motor (not shown) causes angular displacement of the link 16 about the pivot axis A-A; a second motor (not shown) rotates the primary wheels 22 and drives the shuttle 10 in the first direction; and a third motor (not shown) rotates the secondary wheels 24 and drives the shuttle 10 in the second direction.

A limiter 32 is connected to the support platform 14 (albeit that the limiter 32 could alternatively be connected to a bogie 20). What is required is that the limiter 32 be fixed in position relative to the support platform 14, while permitting relative displacement between the limiter 32 and the carriage 12. The limiter 32 defines a rail within which the roller 30 is captured and movable there along. The Figures show the limiter 32 defining a linear rail to guide movement of the roller 30 relative to the support platform 14. Importantly, the limiter 32 limits movement of the roller 30 away from the support platform 14.

In use:
With the primary wheels 22 protruding further from the support platform 14 than the secondary wheels 24, the shuttle 10 is driven by the primary wheels 22 underneath stored goods 28 to be moved.

The first motor is operated to cause angular displacement of the link 16 about the link pivot axis A-A in the first direction to lift the support platform 14 relative to the ground and carriage 12, thereby to cause the operative upper surface of the support platform 14 to contact and raise the goods 28.

The second motor is operated to cause the primary wheels 22 to drive the shuttle 10 (with goods 28 supported on the support platform 14) in the first direction.

To transition the shuttle 10 from the primary wheels 22 to the secondary wheels 24, the first motor is operated to cause angular displacement of the link 16 about the link pivot axis A-A in the second direction to lower the support platform 14 relative to the ground and carriage 12 until the secondary wheels 24 contact the ground. Contact between the secondary wheels 24 and the ground limits further lowering of the support platform 14 relative to the ground. With the secondary wheels 24 now protruding equally or more from the support platform 14 than the primary wheels 22, further operation of the first motor and consequent further angular displacement of the link 16 about the link pivot axis A-A in the second direction: causes operative downward movement of the roller 30 away from the support platform 14 to be limited by the limiter 32; induces tension in the link 16; and lifts the carriage 12 from the ground, towards the support platform 14. With the primary wheels 22 raised from the ground, the shuttle 10 may be driven by the third motor and the secondary wheels 24 in the second direction.

To transition the shuttle 10 from the secondary wheels 24 back to the primary wheels 22, the first motor is operated to cause angular displacement of the link 16 about the link pivot axis A-A in the first direction, thereby to lower the carriage 12 towards the ground and away from the support platform 14.

It will be appreciated that, apart from adding the bogies 20 (with secondary wheels) and the third motor to power the secondary wheels, the only other significant modification required to convert a uni-directional shuttle into a bi-directional shuttle 10 is the addition of the limiter 32. No additional motor is required to transition the shuttle from being supported between the primary and secondary wheels 22 and 24.

The invention claimed is:
1. A bi-directional shuttle including:
a first pair of parallel rails;
a second pair of parallel rails that intersect orthogonally with the first pair of parallel rails;
a support platform for supporting goods thereon;
a carriage connected to the support platform and movable relative to the support platform to enable the support platform to be raised or lowered relative to the carriage;
at least two primary wheels: (i) rotatably connected to the carriage; (ii) fixed against displacement relative to the carriage;
at least two secondary wheels: (i) rotatably connected to the platform; and (ii) fixed against displacement relative to the support platform, the axes of rotation of the secondary wheels being perpendicular to the axes of rotation of the primary wheels;
a cam that is pivotally connected to the carriage about a pivot axis, and that defines a bearing surface that is spaced from the pivot axis and engageable with the support platform to cause the support platform to be raised or lowered relative to the carriage as the cam pivots about the pivot axis; and
a limiter connected to the support platform and that limits displacement of the bearing surface away from the support platform,
wherein:
when the primary wheels are supported on the first pair of parallel rails and protrude further from the support platform than the secondary wheels, angular displacement of the cam about the pivot axis causes the support platform operatively to be raised or lowered relative to: the carriage; the primary wheels; and the first pair of parallel rails; and
when the secondary wheels protrude further from the support platform than the primary wheels and are supported on the second pair of parallel rails, angular displacement of the cam about the pivot axis causes the carriage operatively to be raised or lowered relative to: the support platform; the secondary wheels; and the second pair of parallel rails.

2. A bi-directional shuttle according to claim 1, wherein the cam includes a roller that is rotatably connected to the cam.

3. A bi-directional shuttle according to claim 2, wherein the limiter defines a rail in which the roller is captured, but moveable there along.

4. A bi-directional shuttle according to claim 1, including eight primary wheels and six or eight secondary wheels.

5. A bi-directional shuttle according to claim 1, wherein the support platform is generally cuboid.

6. A bi-directional shuttle according to claim 1, wherein the primary wheels are associated with a first pair of opposed sides of the platform; and the secondary wheels are rotatably connected to a pair of bogies, which bogies are connected to a second pair of opposite sides of the platform.

7. A bi-directional shuttle according to claim 5, including four sets of cams with rollers and limiters.

8. A bi-directional shuttle according to claim 6, including: a first motor for causing angular displacement of the cam about the pivot axis; a second motor for rotating the primary wheels; and a third motor for rotating the secondary wheels.

\* \* \* \* \*